May 8, 1951 — J. L. LEHMAN — 2,551,954
LIGHTING DEVICE HAVING A LENS WHICH GIVES A LONG
AND RELATIVELY NARROW AREA OF ILLUMINATION
Filed Feb. 21, 1947 — 2 Sheets-Sheet 1
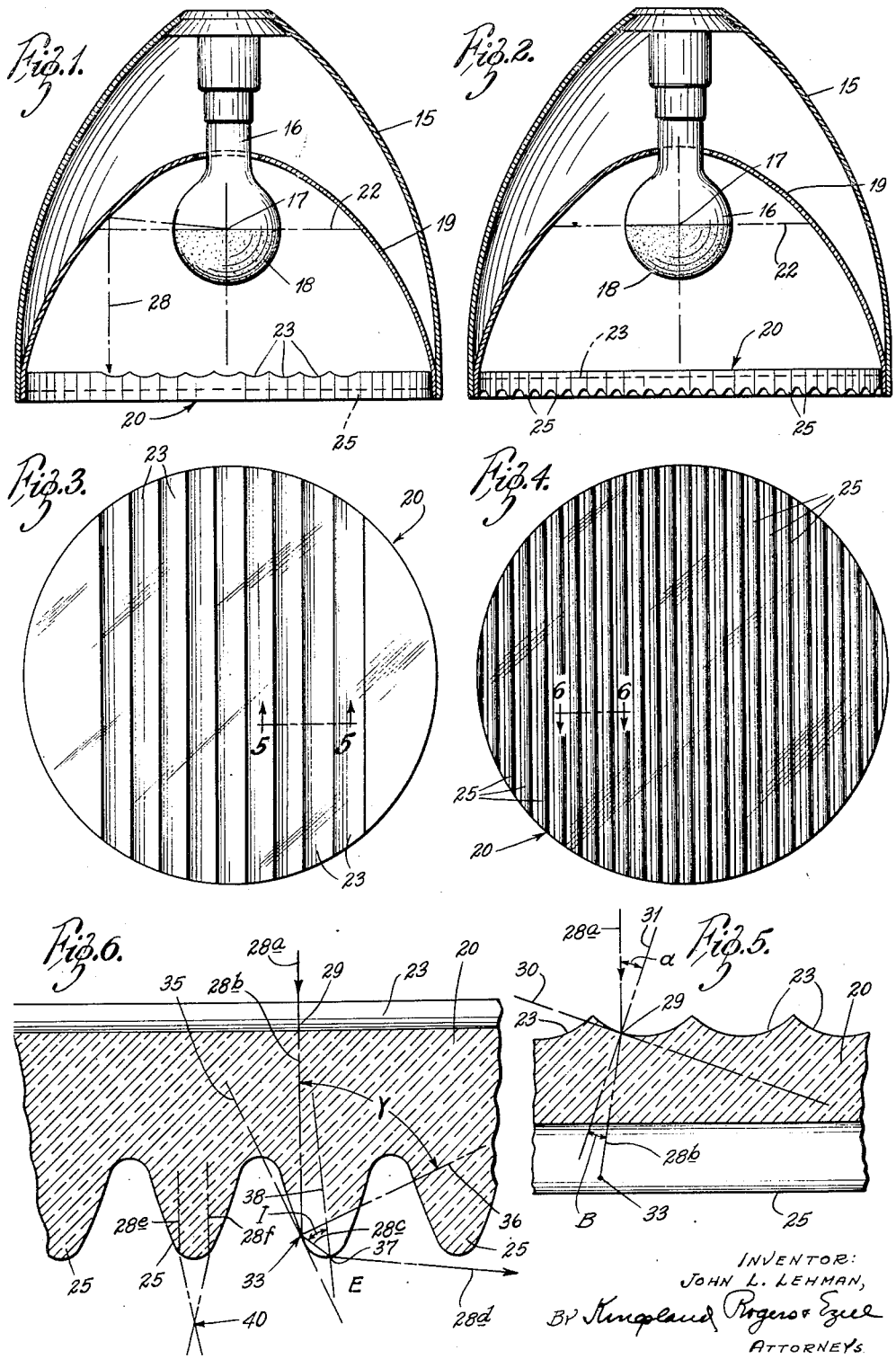
INVENTOR:
JOHN L. LEHMAN,
BY Kingsland, Rogers & Ezell
ATTORNEYS

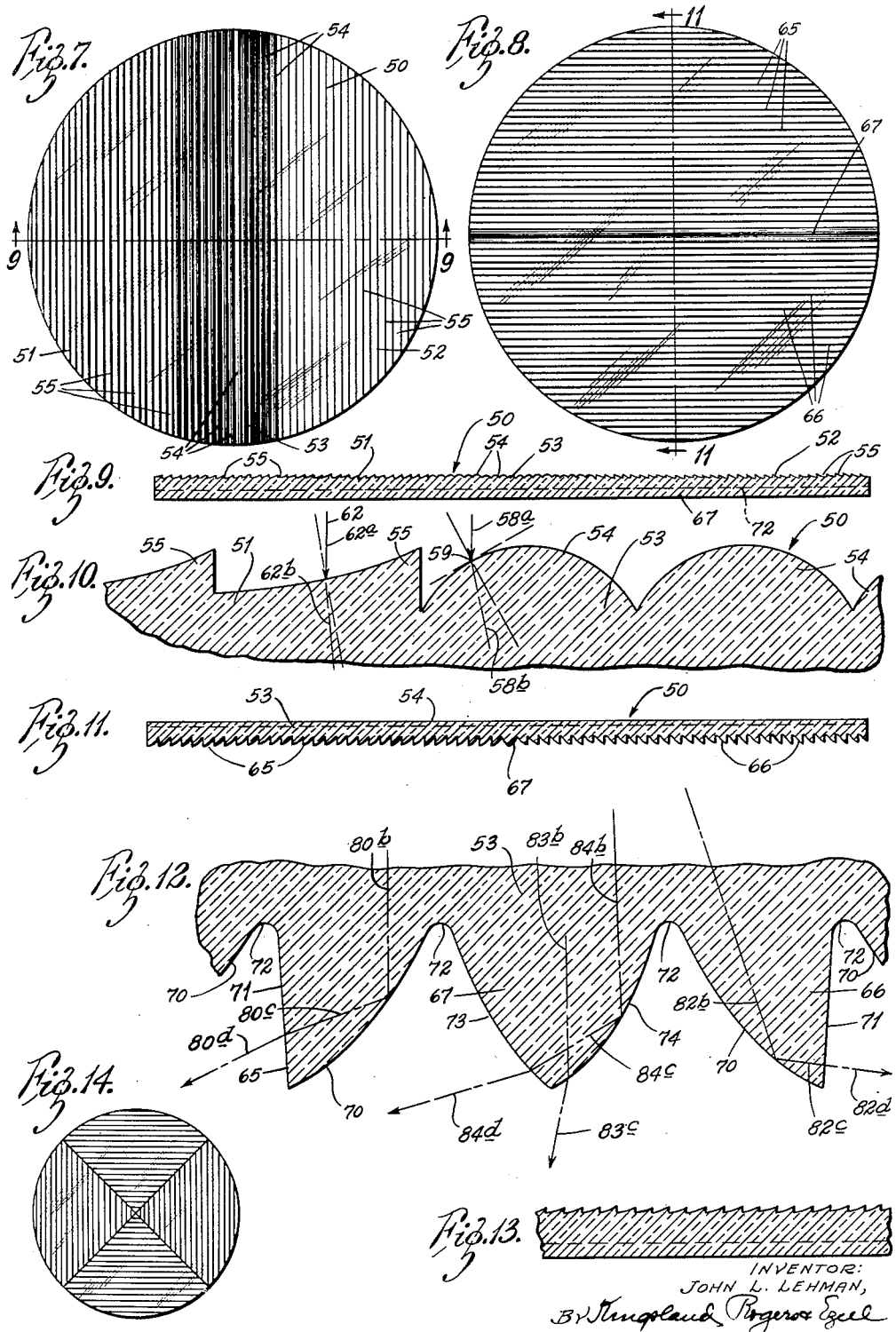

Patented May 8, 1951

2,551,954

UNITED STATES PATENT OFFICE 2,551,954

LIGHTING DEVICE HAVING A LENS WHICH GIVES A LONG AND RELATIVELY NARROW AREA OF ILLUMINATION

John L. Lehman, St. Louis, Mo.

Application February 21, 1947, Serial No. 729,944

5 Claims. (Cl. 240—41.4)

The present invention relates to a lighting device. More particularly, it relates to a lens and lamp combination for producing a particularly shaped area of illumination.

This is a continuation in part of copending application, Serial No. 499,639, filed August 23, 1943, for Fixed Lighting Units, abandoned August 20, 1948.

It is an object of this invention to provide a lens that will, when combined with a lamp, give substantially 180° of illumination. It is a further object of the invention to provide a lens that will give a long and relatively narrow, or oblong, area of illumination. It is a further object of the invention to provide such an oblong area of illumination, with controlled and notably even distribution of the light over the entire area. A particular object is to produce a lens of flat over-all shape that may be used with a parabolic reflector to produce an oblong area of illumination over substantially 180°.

It is a further object of the invention to provide a lens which may be used in combination with a parabolic reflector to obtain a generally strip-like area of illumination.

It is a further object of the invention to provide a lens that may produce a cross-shaped area of illumination, such as is desirable at street intersections, or the like.

Another object is to provide a lens as aforesaid that accomplishes its objectives from a substantially planar glass.

Other objects will appear from the description to follow.

In the drawings:

Fig. 1 is a vertical, medial section through a lamp incorporating the present invention;

Fig. 2 is a view similar to Fig. 1, but taken at right angles thereto;

Fig. 3 is a top view of the lens, as shown in Fig. 1;

Fig. 4 is a bottom view of the lens shown in Fig. 1, Fig. 4 being taken at right angles to Fig. 3;

Fig. 5 is a transverse section through a portion of the lens, taken on the line 5—5 of Fig. 3;

Fig. 6 is a transverse section through a portion of the lens, taken on the line 6—6 of Fig. 4;

Fig. 7 is a top view of a modified form of lens;

Fig. 8 is a bottom view of the modified lens of Fig. 7;

Fig. 9 is a transverse section through the lens of Fig. 7, taken on the line 9—9 thereof;

Fig. 10 is an enlargement of the center part of Fig. 9;

Fig. 11 is a transverse view of the lens shown in Figs. 7 and 8, taken on the line 11—11 of Fig. 8;

Fig. 12 is an enlargement of the center part of Fig. 11;

Fig. 13 is a fragmentary view of a lens, said view being similar to Fig. 9, but representing a slight modification; and Fig. 14 is a view of the bottom surface of a lens designed to produce a cross-shaped area of illumination.

It has been an object for many years to produce a lamp that would produce approximately 180° of illumination, particularly in long, narrow areas. For example, railway platforms require illumination, but the average lamp directs the light primarily down in a circular area, with additional beams extending in a partially spherical pattern. The circular area is of small diameter, and produces relatively little illumination along the narrow platform. If the circle is larger than the width of the platform, the illumination beyond the lateral limits of the platform is wasted, and frequently undesirable. The direct rays and other rays in the spherical pattern are largely projected beyond the limits of the platform, so as to be wasted or directed onto cars or other objects that preferably should not be subjected to them.

The present invention provides a lamp that directs substantially all of its light in a long, narrow path adapted for such uses as the above. It does this by use with a parabolic reflector and a planar lens, which latter is of advantage both in construction and use over a convex lens.

As the width of areas to be illuminated is usually greater than the width of a lamp, the present invention includes means to widen the elongated light pattern without detracting substantially from its length.

In Figs. 1 and 2, a lamp housing is generally indicated at 15. It holds a lamp 16 having a filament disposed approximately at the point 17 therein. As will appear hereinafter, the lamp 16 may have its lower hemisphere 18 rendered opaque, if desired.

The filament 17 of the lamp is disposed within a parabolic reflector 19 at approximately the focal point thereof. This reflector is designed to receive the lens, generally designated at 20.

It may be seen by reference to Fig. 1 that from the parabolic reflector 19 there is an area of maximum light intensity, made up of direct rays plus very dense reflected rays. A parabolic reflector directs all the rays of light striking it straight outwardly, which, in the drawings, is straight downwardly. A line 22, in Figs. 1 and 2, represents a plane through the focal point of the paraboloid. Above this plane 22, there is maximum light intensity, and there will be a cylinder of light projecting forwardly, the cylinder being substantially solid and representing the maximum intensity of the light delivered. The outer part of the reflector below the plane 22 receives light at less density. In fact, if the lower part of the lamp is rendered opaque, as at 18, this outer part of the reflector will receive a minimum of light which is largely light that reaches it because of the inevitable inaccuracy of the parts. But even when the lower part of the lamp 18 is not opaque there will be a less density of light beyond the plane 22 than within it, including both reflected and direct rays.

The lens of the present invention is designed to receive this light and distribute it evenly over a long narrow area. The lens has, on its upper surface, a plurality of flutings 23, which, in Figs. 1, 3 and 5, are shown as being arcuate in cross section, parallel and concave upwardly. They extend, preferably, across the area of maximum illumination, which is a projection of the plane 22. These flutings 23 constitute means to flare the beams of light by bending them in planes transverse to the axes of the flutings, as will appear.

The outer surface of the lens 20 is provided, in Figs. 2, 4 and 6, with a plurality of ribs 25 that are preferably more or less sinusoidal in shape, as shown in Fig. 6. As will appear, the ribs 25 are designed to reflect and refract the beams of light laterally of the ribs and afford the long area of illumination and the substantially 180° illumination. This 180° illumination means that there are light rays discharged from the lamp, in Fig. 2, substantially laterally from both sides and throughout all of the included angles.

The travel of a beam of light through the flutings 23 is indicated in Fig. 5. Therein, a part beam 28a of a beam 28 is typical of all of the beams emanating from the paraboloid reflector, in that it is parallel to all of them. Such beam 28a strikes the fluting 23 at a point 29. Its refraction through the lens is determined by the angular disposition that it has to the tangent 30 to the fluted surface at the point 29 and the normal 31 at such point. The beam 28a has an angle of incidence I with the normal 31. It is refracted by the glass, as shown at 28b, the angle of refraction B being one whose sine is ⅔ the sine of a, with the glass illustrated. The beam 28 will pass thus through the glass until it reaches a point 33, which is a point of contact with one of the ribs 25, as will appear.

The foregoing illustrations will show the flutes 23 act as concave cylindrical lenses which diffuse the light and widen the area of intense light that strikes the lower ribs 25, while maintaining an even distribution. These cylindrical lenses have curvatures suitable to this purpose and controlled by the limitation that the width of the final area of illumination must be a desired width, and yet the curvature must not be so great that the angle of incidence exceeds the critical angle of refraction.

Thus, it will be seen that the beams from the central area of maximum intensity of illumination are spread somewhat when they reach the outer ribs 25 shown on the lower surface of the lens. However, any view of the beam 28b that is taken at right angles to Fig. 5 will find such beam typically represented by a vertical line, owing to the fact that individual beams before and after refraction are parallel to all other similar beams, under the action of these flutes. In Fig. 6, the beam 28a is shown as striking the point 29 of a flute 23, and then passing through to the point 33 on one of the ribs 25. Owing to the curvature of the surface at the point 33, this beam will be initially reflected within the rib. The tangent at the point 33 is indicated at 35, and the normal at 36. The angle $\gamma$ between the beam 28b and the normal 36 is greater than the critical angle, so that the beam will be reflected as shown at 28c, its angle of reflection being the same as its angle of incidence. However, by being reflected, it strikes the surface of the rib 25 at another point 37, wherein its angle I is less than the critical angle to the normal 38. It will thereby be refracted through the surface and project substantially laterally, as shown at 28d, its ultimate angle of refraction E having a sine approximately three halves of the sine of its angle of incidence I.

It thus may be seen that the beam 28, initially projected directly normally to the lens 20, is finally emitted from the lens in a direction substantially laterally thereof.

Other beams parallel to the beam 28 may strike to the left of it in Fig. 6, and thereby be reflected less laterally. Beams striking to the right of the point 33 will, within a certain area, be reflected and refracted even more laterally than the beam 28d.

However, the tips of the ribs 25, within a certain area, will receive beams at less than the critical angle of refraction, so that such beams will be refracted directly, rather than internally reflected. Such area is fairly represented by the two demarcations 28e and 28f of Fig. 6, between which the ribs 25 act as convex cylindrical lenses that focus the beams along lines determined by the curvature of the ribs. In other words, all of the beams striking the ribs between the lines 28e and 28f will be focused into a line 40 that extends parallel with the axis of the cylindrical lens portion. Thereafter, they will again spread and provide illumination directly below the lens. Thus, some of the intense portion of the light delivered from the reflector back of the plane 22 will be reflected and refracted laterally to the remotest points of the area of illumination; whereas other parts of this intense light will be directed downwardly. Also, the valleys between adjacent ribs 25 will act as concave cylindrical lenses in a manner that is well known, and they too will deliver part of the intense light directly downwardly. Also, such light as strikes the lens outside the projection of the plane 22 will be projected both downwardly and outwardly. However, it is important that the intense central portion of the light be deflected to the extremes of the area of illumination because of the decrease in light intensity with distance traveled.

The foregoing lens thus accomplishes the objective of providing substantially 180° illumination in a long narrow area by employing ribs that have surfaces that both refract and reflect the rays. The purpose of the flutings 23 is to control the width of this area. The ribs 25 will perform their function of projecting the light laterally without the presence of the flutings. However, the flutings do give the width aforesaid, and they give it in a manner that can be subject to the control of the ribs, because they do not diffuse the light in miscellaneous directions so that its angles of reflection and refraction from the ribs 25 are not subject to control.

Figs. 7 and 8 show a modification of the foregoing lens, which is used with a similar paraboloid reflector. In this lens, the top surface is generally designated at 50 in Fig. 7. This top surface is divided into two lateral portions 51 and 52 and a central portion 53. In Fig. 10, the central portion is shown in an enlargement as consisting of convex cylindrical ribs 54, whereas the lateral portions 51 and 52 consist of somewhat concave angular ribs 55. The ribs 55, at the left in Fig. 9, are directed as shown in Fig. 10; whereas those ribs in the portion 52, to the right in Fig. 9, project in the opposite directions.

A beam is shown at 58a as entering one of the ribs 54 at the point 59. Such beam will be refracted, as shown at 58b, following the law of refraction. However, the ribs 54 comprise, in their principal parts, cylindrical lenses. Consequently, they will tend to concentrate the rays striking them along lines parallel to the axes of the ribs. Beyond these lines, the beams spread and afford evenly distributed illumination. The bottom crevices between adjacent ribs may have angles to the rays that are such as to cause external reflection of the beams, but such beams then pass through the adjacent ribs. In any case, the refracted beams are all held in planes that are transverse to the axes of the ribs, and are, therefore, parallel to the axes on the lower surface of the lens.

The lateral ribs 51 will receive beams such as the beam 62. The upper surface of each rib 55 curves gradually, but produces some tendency to refract the rays toward the middle of the lens. Thus, the portion 62a of the ray 62 is bent to the position 62b which is toward the center area 53. The bending becomes increasingly less with rays that strike lower portions of the ribs.

The effect of the arrangement is that the center ribs 53 tend to concentrate the rays through given parallel lines, and to produce an even diffusion of these rays for their ultimate distribution by the lower ribs. The side sections 51 and 52, in this type of lens, direct the beams generally inwardly. They pick up beams that are beyond the projection of the plane 22 and dispose them somewhat inwardly. As these ribs on the top surface are parallel to the longitudinal axis of the ultimate area of illumination, it may generally be stated that they provide concentration of the rays in such wise as to afford even distribution across the narrow axis of the area of illumination.

The lower surface of the lens in this modification has a series of lower ribs 65 at one side and a series of lower ribs 66 at the other side, with a center rib 67 between them. The enlargement of Fig. 12 shows the center rib 67 flanked by one of the lower ribs 65 and one of the lower ribs 66.

Reference to Fig. 12 shows each rib 65 as having a curved lower surface 70 terminating in an almost vertical surface 71. An arcuate surface 72 joins the adjacent surface 71 of one rib with the surface 70 of the next. The ribs 66 are similarly shaped, but turned oppositely. The center rib 67 is formed by two curved surfaces 73 and 74.

The function of these ribs is to bend light out into an elongated, relatively narrow illumination pattern that may have substantially 180° extent. The light rays from the reflector reaching these lower ribs are generally in planes parallel to the axes of the lower ribs and of controlled total lateral extent transversely to the main light pattern, as a result of passing through the inner, or upper, ribs.

The total light reaching these lower ribs consists of the parallel reflected rays, the direct rays, and strays.

The surfaces 70 are preferably arcuate or approximately so, and disposed so they will partly act upon the rays from the reflector as portions of cylindrical lenses that direct light toward a line below their common center line. This will be largely true of all rays coming from the reflector and striking these surfaces 70 from approximately the middle down to the top of each. Above this middle line, these reflector rays will largely be internally reflected, owing to the fact that the angle of incidence is greater than the critical angle for glass and air.

The precise location of the division or middle line is subject to variation. However, a desirable lens has resulted from making the ribs .1932" between centers and .1875" deep from the upper part of the surfaces 72 to the tips where the surfaces 70 and 71 intersect. The surfaces 72 are on .0156" radius, and the surfaces 71 slope .008" from their intersection with the arcuate surfaces 72 to the tips. The surfaces 70 are curved on a .372" radius. The center rib 67 has a .25" width between centers of its flanking surfaces 72 and has its surfaces 73 and 74 on a .297" radius. All teeth in the illustration are equally deep. For a lens with effective radius of 6.2075", the paraboloid reflector may have its focus 17, at which the filament is located, spaced 2½" above the upper surface of the lens. Preferably, the lower surface of the lens, formed by the tip edges of the ribs, slopes upwardly and outwardly from the center rib. For the sizes given, the outer ribs 65 and 66 are $\frac{1}{16}$" above the center rib 67. Such lamp provides a clear, elongated light pattern, particularly when spaced about 14 feet above the ground.

The design typified by the foregoing dimensions produces the oblong pattern of illumination. Rays made perpendicular by the reflector, plus direct perpendicular rays at the center, are spread in a path determined by the lateral extent of the upper flutings 53, as shown at 58b, and confined by the sections 51 and 52, as shown at 62b. The lens is normally high enough from the ground to give a cross-over effect by the cylindrical ribs 54, and this combination of the upper flutes concentrates the light within a pattern of chosen width.

The ribs 65 and 66 act oppositely. Above their division line aforesaid, the reflected rays 80b, in parallel planes parallel to the length of the bottom ribs, are internally reflected as shown at 80c from the surfaces 70. They then are refracted at 80d outwardly and downwardly from the surfaces 71, giving illumination in an intermediate area lengthwise from the lamp. Rays of this group striking the lens below the division line of the critical angle are refracted downwardly and outwardly, but somewhat less outwardly than the first group, and illuminating an area extending to below the lamp. This area below the lamp is also illuminated by rays passing through the concave cylindrical surfaces 72.

Direct rays from the filament can strike the lens and pass to the lower ribs, as shown at 82b. (Actually, a ray having the illustrated angle would pass into a rib 66 much further from the center.) Such rays are reflected from the surface 70 internally, at 82c, and then are refracted outwardly at 82d to provide the greatest longitudinal reaches of the pattern of illumination. Other direct rays striking the lower ribs further from the center cannot meet the surface 70, and are refracted downwardly from the surfaces 71 in one of the nearer areas of the pattern. It thus appears that, with this lens, a primary source of the most endwise illumination is the direct rays, such as 82d. The quantity of such rays is a function of the angles between them and the plane of the lens, and of the distance between the lens and the filament. In design of the lens, this quantity of rays is also a function of the depth of the bottom ribs and the angles of the normals to the surface at the points such rays strike the surface 70.

The center rib 67 typifies a ribbing that not only divides the sections 65 and 66, but also participates in the division of the light. Rays 83b striking below the dividing line at the critical angle for the surfaces 73 and 74 pass downwardly at 83c, as from two sections of a cylindrical lens, and illuminate an area directly below the lamp. Rays such as 84b, striking above this division line, are internally reflected at 84c from one surface, as 74, to the other surface 73, from which they are refracted at 84d outwardly in large quantity to the far reaches of the pattern of illumination. The number of such middle ribs 67 may be varied as a means of increasing the illumination at the extremes.

Fig. 14 shows a lens divided into quadrants, and having outer ribbing configured like either Fig. 6 or Fig. 12. As will be apparent, such lens is valuable at intersections, to throw a cross-shaped light pattern.

The result of all the foregoing is a light pattern that gives brilliant illumination over an oblong pattern extending substantially 180° in a diametrical plane perpendicular to the face of the lens. This lens, made in accordance with the dimensions cited for Figs. 7–14, gives a more intense illumination in the near area than in the far reaches, as is desirable in certain installations. It illustrates the use of a large number of ribs across a lens, having parts that reflect and other parts that refract the rays, and ribs that distribute both the direct and the reflected rays into an elongated pattern of illumination with minimum lateral deviation from such pattern.

It is, of course, not contended that the prismatic or lenticular theories of reflection and refraction are new. What the applicant claims, as set forth hereinafter, is a construction combining particular types of prism-lens arrangements that achieve a particular result in a desirable way.

What is claimed is:

1. A lens for use with a parabolic reflector and a light source therein, the lens comprising a substantially planar piece of glass or like light-transmitting material adapted to extend across the reflector and having an area greater than the area of a plane through the focal point of the reflector parallel to the plane of the lens, the lens having its outer surface covered with a plurality of closely spaced elongated ribs that extend in parallelism, all of the ribs being as follows: each rib having a smoothly curved surface on one of its sides from its base to its tip edge, the normal to said smoothly curved surface adjacent the base of the rib being at an angle to a normal to the plane of the glass that is greater than the critical angle of the glass, the normal to said surface adjacent the tip of the rib being at an angle less than the critical angle of the glass, and intermediate normals between said two normals grading smoothly from one to the other, whereby light entering the lens in planes parallel to the ribs will be internally reflected by the smoothly curved surfaces thereof whereof the angles are greater than the critical angle, and will be refracted outwardly by the surfaces whereon the angles are less than the critical angle, and each rib having another surface on its other side that refracts the rays thus internally reflected, and discharges them laterally of the lens, the grooves on the outer surface between adjacent ribs being smoothly curved and providing small, concave surfaces; and the inner surface of the lens being shaped to direct rays into the lens without refracting them transversely of the ribs.

2. A lens for use with a parabolic reflector and a light source therein, the lens comprising a substantially planar piece of glass or like light-transmitting material adapted to extend across the reflector and having an area greater than the area of a plane through the focal point of the reflector parallel to the plane of the lens, the lens having its outer surface covered with a plurality of closely spaced elongated ribs that extend in parallelism, all of the ribs being as follows: each rib having a smoothly curved surface on one of its sides from its base to its tip edge, the normal to said smoothly curved surface adjacent the base of the rib being at an angle to a normal to the plane of the glass that is greater than the critical angle of the glass, the normal to said surface adjacent the tip of the rib being at an angle less than the critical angle of the glass, and intermediate normals between said two normals grading smoothly from one to the other, whereby light entering the lens in planes parallel to the ribs will be internally reflected by the smoothly curved surfaces thereof whereof the angles are greater than the critical angle, and will be refracted outwardly by the surfaces whereon the angles are less than the critical angle, and each rib having another surface on its other side that refracts the rays thus internally reflected, and discharges them laterally of the lens, said rib surfaces on the two sides of each rib together constituting a generally sinusoidal curvature from the base of the rib on one side to the base of the rib on the other; the grooves on the outer surface between adjacent ribs being smoothly curved and providing small, concave surfaces; and the inner surface of the lens being shaped to direct rays into the lens without refracting them transversely of the ribs.

3. A lens for use with a parabolic reflector and a light source therein, the lens comprising a substantially planar piece of glass or like light-transmitting material adapted to extend across the reflector and having an area greater than the area of a plane through the focal point of the reflector parallel to the plane of the lens, the lens having its outer surface covered with a plurality of closely spaced elongated ribs that extend in parallelism, all of the ribs being as follows: each rib having a smoothly curved surface on one of its sides from its base to its tip edge, the normal to said smoothly curved surface adjacent the base of the rib being at an angle to a normal to the plane of the glass that is greater than the critical angle of the glass, the normal to said surface adjacent the tip of the rib being at an angle less than the critical angle of the glass, and intermediate normals between said two normals grading smoothly from one to the other, whereby light entering the lens in planes parallel to the ribs will be internally reflected by the smoothly curved surfaces thereof whereof the angles are greater than the critical angle, and will be refracted outwardly by the surfaces whereon the angles are less than the critical angle, and each rib having another surface on its other side that refracts the rays thus internally reflected, and discharges them laterally of the lens, said other rib surface of substantially all of the ribs being substantially flat and being at an acute angle to a normal to the plane of the lens, and merging into the said one surface of the rib in an edge; the grooves on the outer surface between adjacent ribs being smoothly curved and providing small, concave surfaces; and the inner surface of the lens being shaped to direct rays into the lens without refracting them transversely of the ribs.

4. A lens for use with a parabolic reflector and a light source therein, the lens comprising a substantially planar piece of glass or like light-transmitting material adapted to extend across the reflector and having an area greater than the area of a plane through the focal point of the reflector parallel to the plane of the lens, the lens having its outer surface covered with a plurality of closely spaced elongated ribs that extend in parallelism, all of the ribs being as follows: each rib having a smoothly curved surface on one of its sides from its base to its tip edge, the normal to said smoothly curved surface adjacent the base of the rib being at an angle to a normal to the plane of the glass that is greater than the critical angle of the glass, the normal to said surface adjacent the tip of the rib being at an angle less than the critical angle of the glass, and intermediate normals between said two normals grading smoothly from one to the other, whereby light entering the lens in planes parallel to the ribs will be internally reflected by the smoothly curved surfaces thereof whereof the angles are greater than the critical angle, and will be refracted outwardly by the surfaces whereon the angles are less than the critical angle, and each rib having another surface on its other side that refracts the rays thus internally reflected, and discharges them laterally of the lens, said other rib surface of substantially all of the ribs being substantially flat and being at an acute angle to a normal to the plane of the lens, and merging into the said one surface of the rib in an edge, the ribs on opposite sides of a medial line facing in opposite directions; the grooves on the outer surface between adjacent ribs being smoothly curved and providing small, concave surfaces; and the inner surface of the lens being shaped to direct rays into the lens without refracting them transversely of the ribs.

5. A lens for use with a parabolic reflector and a light source therein, the lens comprising a substantially planar piece of glass or like light-transmitting material adapted to extend across the reflector and having an area greater than the area of a plane through the focal point of the reflector parallel to the plane of the lens, the lens having its outer surface covered with a plurality of closely spaced elongated ribs that extend in parallelism, all of the ribs being as follows: each rib having a smoothly curved surface on one of its sides from its base to its tip edge, the normal to said smoothly curved surface adjacent the base of the rib being at an angle to a normal to the plane of the glass that is greater than the critical angle of the glass, the normal to said surface adjacent the tip of the rib being at an angle less than the critical angle of the glass, and intermediate normals between said two normals grading smoothly from one to the other, whereby light entering the lens in planes parallel to the ribs will be internally reflected by the smoothly curved surfaces thereof whereof the angles are greater than the critical angle, and will be refracted outwardly by the surfaces whereon the angles are less than the critical angle, and each rib having another surface on its other side that refracts the rays thus internally reflected, and discharges them laterally of the lens, the grooves on the outer surface between adjacent ribs being smoothly curved and providing small, concave surfaces; and the inner surface of the lens being shaped to direct rays into the lens without refracting them transversely of the ribs, the said shaping of the inner surface comprising a plurality of internal ribs at right angles to the external ribs, said internal ribs being shaped to spread the rays of light only in a direction at 90° to the spread by the external ribs.

JOHN L. LEHMAN.

REFERENCES CITED

The following references are of record in the file of this patent:

UNITED STATES PATENTS

| Number | Name | Date |
|---|---|---|
| 1,345,073 | Clark | June 29, 1920 |
| 1,399,749 | Conklin | Dec. 13, 1921 |
| 1,402,816 | Wallis | Jan. 10, 1922 |
| 1,457,980 | McMasters | June 5, 1923 |
| 1,788,936 | Wood | Jan. 13, 1931 |
| 2,308,100 | Onksen et al. | Jan. 12, 1943 |